(12) United States Patent
Koh

(10) Patent No.: US 9,210,152 B2
(45) Date of Patent: Dec. 8, 2015

(54) METHOD FOR DETECTING SMART KEY AROUND VEHICLE

(71) Applicant: Dong Woo Koh, Seoul (KR)

(72) Inventor: Dong Woo Koh, Seoul (KR)

(73) Assignee: HYUNDAI AUTRON CO., LTD., Seongnam-Si (KR)

( * ) Notice: Subject to any disclaimer, the term of this patent is extended or adjusted under 35 U.S.C. 154(b) by 0 days.

(21) Appl. No.: 14/107,657

(22) Filed: Dec. 16, 2013

(65) Prior Publication Data

US 2014/0172243 A1 Jun. 19, 2014

(30) Foreign Application Priority Data

Dec. 14, 2012 (KR) ........................ 10-2012-0146677

(51) Int. Cl.
  *B60R 22/00* (2006.01)
  *E05F 15/00* (2015.01)
  *G05D 1/00* (2006.01)
  *G06F 7/00* (2006.01)
  *H04L 29/06* (2006.01)
  *G08C 17/02* (2006.01)

(52) U.S. Cl.
  CPC ................ *H04L 63/08* (2013.01); *G08C 17/02* (2013.01)

(58) Field of Classification Search
  CPC ................................ G08C 17/02; H04L 63/08
  USPC ........................................................... 701/49
  See application file for complete search history.

(56) References Cited

U.S. PATENT DOCUMENTS

2012/0109422 A1* 5/2012 Katou .............................. 701/2

* cited by examiner

*Primary Examiner* — Maceeh Anwari
(74) *Attorney, Agent, or Firm* — Mayer Brown LLP; Hyunho Park

(57) ABSTRACT

A method for detecting a smart key around a vehicle includes: searching a smart key around a vehicle by emitting a registration request message at each preset emission period; when a response message to the registration request message is received from the smart key, checking whether or not the reception of the response message is maintained during a predetermined time; when the reception of the response message is maintained during the predetermined time, emitting an authentication request message containing encryption information for authenticating the smart key; and when an authentication message to the authentication request message is received from the smart key, authenticating the smart key based on the authentication message.

7 Claims, 6 Drawing Sheets

METHOD FOR DETECTING SMART KEY AROUND VEHICLE

CROSS-REFERENCES TO RELATED APPLICATIONS

The present application claims priority to Korean application number 10-2012-0146677, filed on Dec. 14, 2012, which is incorporated by reference in its entirety.

BACKGROUND OF THE INVENTION

The present invention relates to a method for detecting a smart key around a vehicle, and more particularly, to a method for detecting a smart key around a vehicle, which sequentially performs a search operation and an authentication operation for a smart key existing around a vehicle using different messages.

In general, a smart key is a device through which a driver unlocks a vehicle door to start an engine or open a trunk or tail gate, without using a physical key or remote control device.

Recently, with the increase in quality of vehicles, the use of a smart key has increased. Thus, a smart key unit is mounted on a vehicle so as to search and authenticate a smart key around the vehicle, thereby performing a specific operation.

The smart key unit periodically emits a signal. When a response signal to the emitted signal is received from a smart key around the vehicle, the smart key unit authenticates the smart key so as to perform a specific operation.

However, the signal emitted from the conventional smart key unit includes encryption information for authenticating the smart key. Thus, the smart key unit may consume a large amount of power to search and authenticate the smart key.

That is, even when no smart keys exist around the vehicle, the smart key unit continuously emits a signal to search the smart key. Since the smart key unit must repetitively emit a large-volume message containing encryption information, power consumption inevitably increases, and interference with other vehicles positioned around the vehicle also increases.

The related art of the present invention is disclosed in Korean Patent Laid-open Publication No. 10-2010-0029988 published on Mar. 18, 2010 and entitled "Detecting Apparatus of Smart Key in Passive Keyless Entry System".

SUMMARY OF THE INVENTION

Embodiments of the present invention are directed to a method for detecting a smart key around a vehicle, which sequentially performs a search operation and an authentication operation for a smart key existing around a vehicle using different messages, thereby reducing power consumption of a smart key unit and interference with surrounding vehicles.

In one embodiment, a method for detecting a smart key around a vehicle includes: searching a smart key around a vehicle by emitting a registration request message at each preset emission period; when a response message to the registration request message is received from the smart key, checking whether or not the reception of the response message is maintained during a predetermined time; when the reception of the response message is maintained during the predetermined time, emitting an authentication request message containing encryption information for authenticating the smart key; and when an authentication message to the authentication request message is received from the smart key, authenticating the smart key based on the authentication message.

The registration request message may have a smaller volume than the authentication request message.

Each of the registration request message and the authentication request message may include: a wakeup pattern region containing information for checking whether or not the smart key is a smart key registered for the vehicle; and a command region containing information for distinguishing the registration request message or the authentication request message from each other.

The method may further include controlling a trunk driving part to open a trunk, when the authentication succeeds.

The method may further include: determining whether the trunk is opened or not; and when the trunk is not opened, returning to the searching of the smart key around the vehicle, after the controlling of the trunk driving part to open the trunk.

The method may further include emitting an initialization message to initialize the smart key, when the authentication succeeds.

The method may further include re-emitting the authentication request message to re-authenticate the smart key, when the authentication fails.

The method may further include checking whether or not the operation mode of the smart key is a hands-free mode, based on the response message.

In accordance with the embodiments of the present invention, the method for detecting a smart key around a vehicle performs the search operation for the smart key using the small-volume registration request message including no encryption information, and performs the authentication operation using the authentication request message including encryption information. Thus, the power consumption may be reduced while security is maintained.

Furthermore, since the smart key around the vehicle is searched through the small-volume registration request message, the interference with surrounding vehicles may be reduced.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
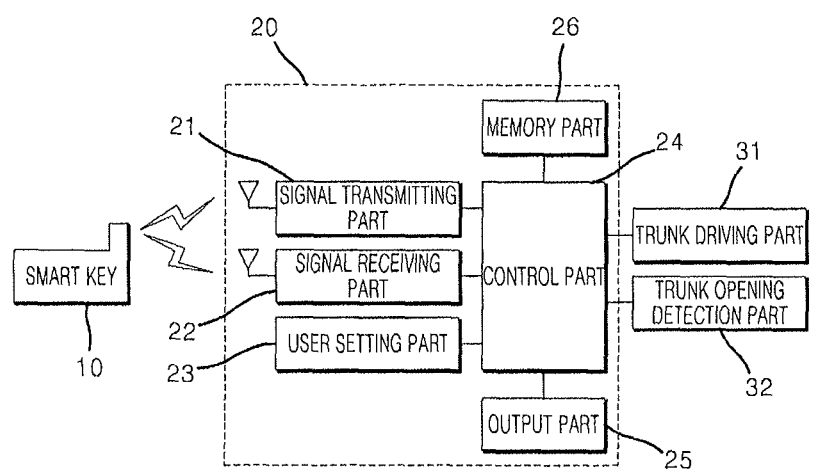
FIG. 1 is a block diagram illustrating a device for performing a method for detecting a smart key around a vehicle in accordance with an embodiment of the present invention.
Figure 2:
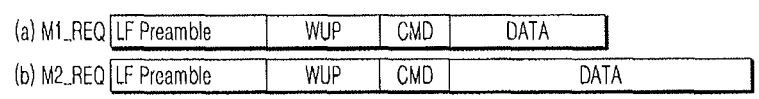
FIG. 2 is a diagram illustrating the structures of a registration request message and an authentication request message in relation with the method for detecting a smart key around a vehicle in accordance with the embodiment of the present invention.

FIG. 1 is a block diagram illustrating a device for performing a method for detecting a smart key around a vehicle in accordance with an embodiment of the present invention. FIG. 2 is a diagram illustrating the structures of a registration request message and an authentication request message in relation with the method for detecting a smart key around a vehicle in accordance with the embodiment of the present invention.

Referring to FIG. 1, the device for performing the method for detecting a smart key around a vehicle in accordance with the embodiment of the present invention may basically include a smart key 10 and a smart key unit 20 and further include a trunk driving part 31 and a trunk opening detection part 32.

The smart key 10 is a device through which a driver unlocks a vehicle door to start an engine or open a trunk or tail gate, without a physical key.

Regardless of the name, the smart key 10 may include all kinds of devices which are capable of receiving a low frequency (LF) signal emitted from the smart key unit 20 and transmitting a radio frequency (RF) signal in an ultra high frequency (UHF) band to the smart key unit 20.

The smart key unit 20 may be configured to search and authenticate the smart key 10 around the vehicle and perform a specific operation according to an operation mode of the smart key 10.

At this time, the specific operation may include various operations for providing convenience to the driver, for example, an operation of unlocking the door of the vehicle, an operation of turning on a welcome light or escort lamp, an operation of opening a trunk or tail gate, an operation of starting an engine, and an operation of driving a side mirror or seat.

In the present embodiment, a case in which the operation of opening the trunk or tail gate among the above-described operations is performed will be taken as an example for description. However, the present invention is not limited thereto, but may be applied in the same manner to the other operations.

The smart key unit 20 may include a signal transmitting part 21, a signal receiving part 22, a user setting part 23, a control part 24, an output part 25, and a memory part 26.

The signal transmitting part 21 emits a signal to around the vehicle, and the operation of the signal transmitting part 21 is controlled by the control part 24. At this time, the signal emitted from the signal transmitting part 21 may include LF signals having a frequency range of 30 to 300 kHz.

The signal emitted from the signal transmitting part 21 may contain a message for checking the smart key 10 registered for a specific vehicle or authenticating the validity of the smart key 10.

In this connection, the present embodiment is characterized in that any one of a registration request message M1_REQ and an authentication request message M2_REQ is loaded into the signal emitted from the signal transmitting part 21.

FIG. 2 illustrates the structures of the registration request message M1_REQ and the authentication request message M2_REQ. Referring to FIG. 2, each of the registration request message M1_REQ and the authentication request message M2_REQ may include a preamble region LF PRE-AMBLE, a wakeup pattern region WUP, a command region CMD, and a data region DATA.

The registration request message M1_REQ is a message for searching the smart key 10 existing around the vehicle, and the data region DATA of the registration request message M1_REQ does not include encryption information for authentication.

The authentication request message M2_REQ is a message for authenticating the validity of the smart key 10 searched through the registration request message M1_REQ, and the data region DATA of the authentication request message M2_REQ includes encryption information for authentication.

Since the authentication request message M2_REQ includes the encryption information in which a relatively large amount of information is contained, the authentication request message M2_REQ has a larger message length than the registration request message M1_REQ. That is, the registration request message M1_REQ has a smaller volume than the authentication request message M2_REQ.

Thus, the smart key unit 20 emits the small-volume registration request message M1_REQ so as to search the smart key 10, and emits the large-volume authentication request message M2_REQ in a state where the smart key 10 is searched. Thus, the power consumption of the smart key unit 20 and the interference with surrounding vehicles may be reduced.

The preamble region LF PREAMBLE of each of the registration request message M1_REQ and the authentication request message M2_REQ contains information for announcing transmission of the message.

The wakeup pattern region WUP contains unique information on the vehicle or the smart key 10, and is used to check whether or not the smart key 10 is a smart key registered for a specific vehicle.

The command region CMD contains information for distinguishing the registration request message M1_REQ and the authentication request message M2_REQ from each other.

The signal receiving part 22 receives a signal transmitted from the smart key 10 in response to the signal emitted from the signal transmitting part 21. At this time, the signal received from the smart key 10 may include RF signals in the UHF band having a frequency range of 300 to 3,000 MHz.

The signal received from the smart key 10 may contain a response message M1_RSP to the registration request message M1_REQ or an authentication message M2_RSP to the authentication request message M2_REQ.

The user setting unit 23 receives setting information on the operation mode of the smart key 10 from a user and transmits the received information to the control part 24. At this time, the operation mode of the smart key 10 may include a hands-free mode in which a specific operation is performed when the smart key 10 is positioned around the vehicle.

The setting information which is previously inputted through the user setting part 23 is transmitted and stored into the smart key 10, and may be included in the response message M1_RSP transmitted to the smart key unit 20 from the smart key 10. That is, the smart key unit 20 may check the above-described setting information from the response message M1_RSP received from the smart key 10.

The control part 24 emits the registration request message M1_REQ at each preset emission period Ta, and searches the smart key 10 around the vehicle.

When the smart key 10 is searched through the search operation, the control part 24 emits the authentication request message M2_REQ containing encryption information and performs authentication for the smart key 10.

When the authentication for the smart key 10 succeeds, the control part 24 outputs a control signal to the trunk driving part 31 to open the trunk or tail gate, and emits an initialization message M_Clear to initialize the smart key 10.

The process in which the control part 24 sequentially perform the search operation and the authentication operation for the smart key 10 using the registration request message M1_REQ and the authentication request message M2_REQ will be described below in detail with reference to FIGS. 3 to 6.

The output unit 25 outputs the search result and the authentication result for the smart key 10 through a lamp (not illustrated) or display panel (not illustrated), and the search result and the authentication result may be stored in the memory part 26.

The memory part 26 may store the search result and the authentication result for the smart key 10. As described below, the memory part 26 may store information on the number of re-authentications in relation with the authentication of the smart key 10.

The trunk driving part 31 opens the trunk or tail gate, and the operation of the trunk driving part 31 is controlled by the control part 24.

The trunk opening detection part 32 detects whether the trunk or tail gate is opened or not, generates a detection signal, and outputs the generated detection signal to the control part 24.

Figure 3:
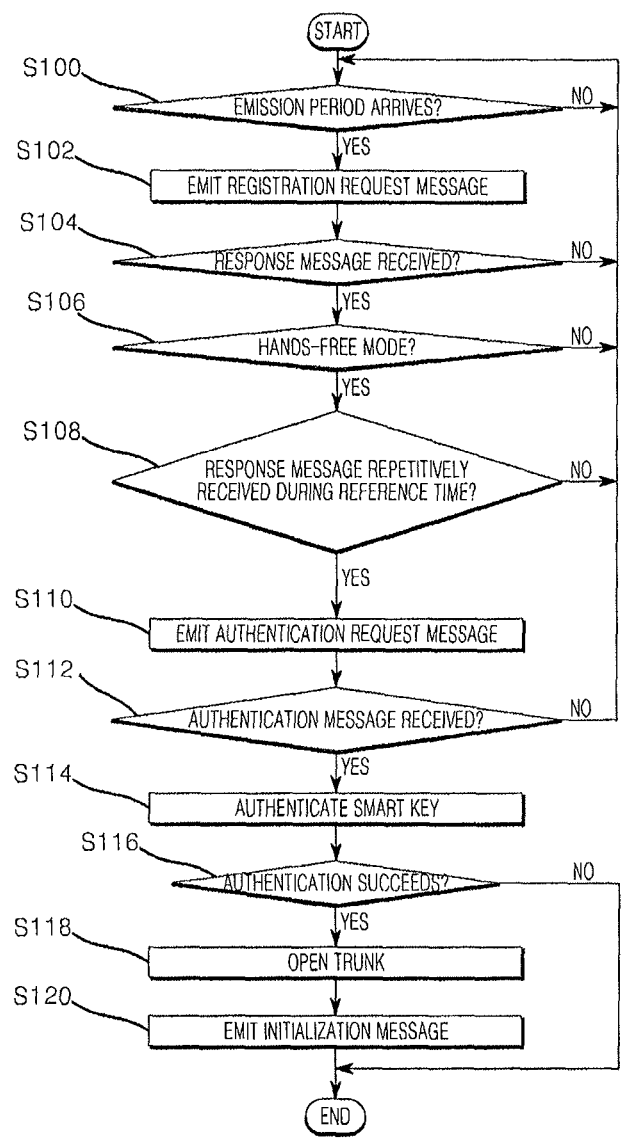
FIG. 3 is a flowchart for explaining the method for detecting a smart key around a vehicle in accordance with the embodiment of the present invention.
Figure 4:
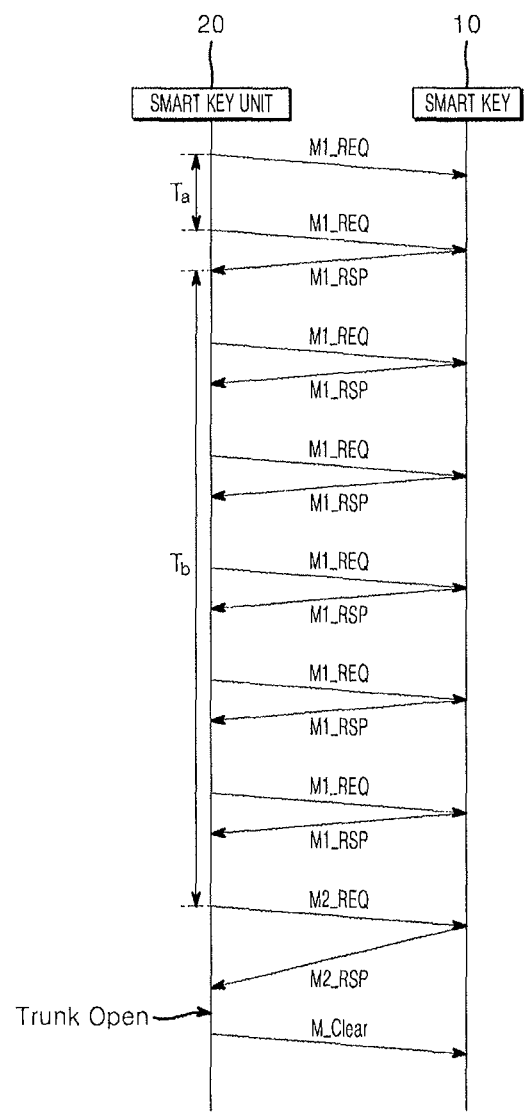
FIG. 4 is a diagram sequentially illustrating processes of the method for detecting a smart key around a vehicle in accordance with the embodiment of the present invention.

FIG. 3 is a flowchart for explaining the method for detecting a smart key around a vehicle in accordance with the embodiment of the present invention. FIG. 4 is a diagram sequentially illustrating processes of the method for detecting a smart key around a vehicle in accordance with the embodiment of the present invention.

Referring to FIGS. 3 and 4, a process of searching and authenticating a smart key existing around a vehicle will be described in detail.

Referring to FIG. 3, the control part 24 of the smart key unit 20 checks whether a preset emission period Ta arrives or not, at step S100.

The emission period Ta indicates a period at which the smart key unit 20 emits the registration request message M1_REQ to search the smart key 10, and may be set in various manners depending on a designer's intention and the specification of the signal transmitting part 21. The emission period Ta may be set to a value of 240 or 480 msec, for example.

When the emission period Ta arrives, the control part 24 drives the signal transmitting part 21 to emit the registration request message M1_REQ at step S102, and checks whether or not a response message M1_RSP to the registration request message M1_REQ is received from the smart key 10 existing around the vehicle at step S104.

When the emission period Ta arrives in a state where the response message M1_RSP to the registration request message M1_REQ is not received, the control part 24 repetitively emits the registration request message M1_REQ.

On the other hand, when the response message M1_RSP to the registration request message M1_REQ is received from the smart key 10 around the vehicle, the control part 24 checks whether or not the smart key 10 is set to a hands-free mode, from setting information included in the response message M1_RSP, at step S106.

When the smart key 10 is set to the hands-free mode, the control part 24 checks whether or not the response message M1_RSP to the registration request message M1_REQ is repetitively received during a reference time Tb, at step S108.

The reference time Tb indicates a time required for checking whether the smart key 10 having transmitted the initial response message certainly exists around the vehicle, and may be set in various manners depending on a designer's intention. The reference time Tb may be set to a value of 2 to 3 sec, for example.

Referring to FIG. 4, when the response message M1_RSP is repetitively received during the reference time Tb, it may be considered that the smart key 10 certainly exists around the vehicle. Thus, the control part 24 drives the signal transmitting part 21 to emit the authentication request message M2_REQ at step S110, and checks whether or not an authentication message M2_RSP to the authentication request message M2_REQ is received, at step S112.

As such, the smart key unit 20 emits the registration request message M1_REQ having a small volume to search the smart key 10, and emits the authentication message M2_REQ having a relatively large volume after the smart key 10 is searched. Such an operation may reduce the power consumption of the smart key unit 20 and the interference with surrounding vehicles.

When the authentication message M2_RSP to the authentication request message M2_REQ is received from the smart key 10 around the vehicle, the control part 24 authenticates the smart key 10 based on the authentication message M2_RSP at step S114.

Then, the control part 24 determines whether or not the authentication for the smart key 10 succeeds at step S116. When the authentication succeeds, the control part 24 outputs a control signal to the trunk driving part 31 to open the trunk or tail gate at step S118.

Then, the control part 24 emits the initialization message M_Clear to initialize the smart key 10 at step S120.

The initialization message M_Clear indicates a message which clears the information on the registration request message M1_REQ or the authentication request message M2_REQ transmitted to the smart key 10 from the smart key unit 20, thereby initializing the smart key 10.

When the smart key 10 is not set to the hands-free mode, the response message M1_RSP is not repetitively received from the smart key 10 during the reference time Tb, or the authentication message M2_RSP is not received from the smart key 10, the control part 24 returns to steps S100 and S102 of checking whether the emission period Ta arrives or not and transmitting the registration request message M1_REQ, and performs the search and authentication operation for the smart key 10 from the beginning.

Figure 5:
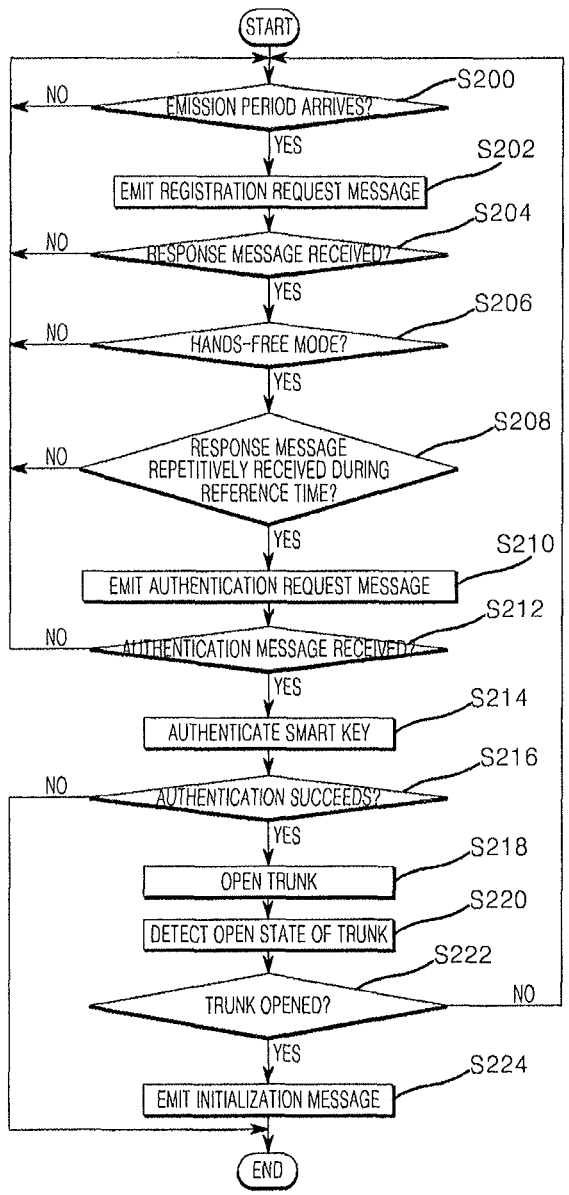
FIG. 5 is a flowchart for explaining a method for detecting a smart key around a vehicle in accordance with another embodiment of the present invention.

FIG. 5 is a flowchart for explaining a method for detecting a smart key around a vehicle in accordance with another embodiment of the present invention.

Even when the search and authentication operations for the smart key 10 are successively performed to output a control signal to the trunk driving part 31, the trunk or tail gate may be not opened due to a mechanical defect of the trunk or tail gate or a transmission trouble of the control signal.

Thus, the method in accordance with the embodiment of the present invention may include checking whether the trunk or tail gate is actually opened or not, after the control signal is outputted to the trunk driving part 31, and performing the search and authentication operation for the smart key 10 when the trunk or tail gate is not opened.

Referring to FIG. 5, the additional operations will be described. The control part 24 outputs a control signal to the trunk driving part 31 at step S218, and then checks whether the trunk or tail gate is opened or not, based on a detection signal received from the trunk opening detection part 32, at step S220.

When it is determined that the trunk or tail gate is opened, it may be considered that the trunk or tail gate is normally opened. Thus, the control part 24 emits the initialization message M_Clear to initialize the smart key 10 at step S224.

On the other hand, when it is determined that the trunk or tail gate is not opened, it may be considered that the operation is not normally performed. Thus, the control part 24 returns to steps S200 and S202 of checking whether the emission period Ta arrives or not and transmitting the registration request message M1_REQ, and performs the search and authentication operation for the smart key 10 from the beginning.

The process from step S200 of determining whether the emission period Ta arrives or not to step S218 of opening the trunk is the same as the process from step S100 to step S118 in FIG. 4. Thus, the detailed descriptions thereof are omitted herein.

As such, when the opening of the trunk or tail gate is checked to resume the search and authentication for the smart key 10, the opening operation may be performed within a short time. Thus, the reliability of the operation may be improved.

Figure 6:
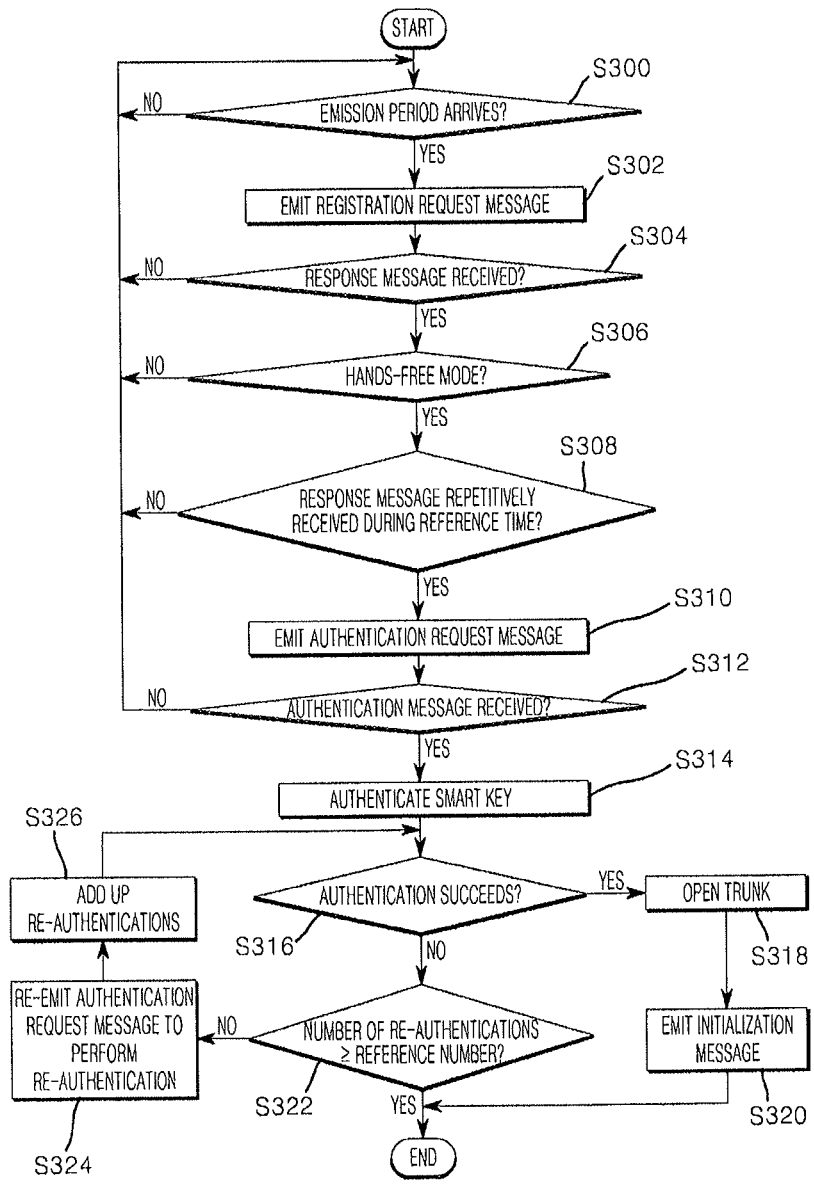
FIG. 6 is a flowchart for explaining a method for detecting a smart key around a vehicle in accordance with another embodiment of the present invention.

FIG. 6 is a flowchart for explaining a method for detecting a smart key around a vehicle in accordance with another embodiment of the present invention.

When the authentication for the smart key 10 fails, it may be considered that the smart key 10 is a valid smart key. Thus, the operation of opening the trunk is not performed. However, although the smart key 10 is a valid smart key, the authentication may fail due to a communication trouble or authentication error.

Thus, the method in accordance with the embodiment of the present invention may perform re-authentication by a predetermined reference number even though the authentication for the smart key 10 fails, thereby substantially preventing a authentication failure which may occur even though the smart key 10 is a valid smart key.

Referring to FIG. 6, such an operation will be described. When the authentication for the smart key 10 succeeds, the control part 24 outputs a control signal to the trunk driving part 31 to open the trunk or tail gate at step S318, and emits the initialization message M_Clear to initialize the smart key 10 at step S320.

On the other hand, when the authentication fails, the control part 24 compares the number of re-authentications to the reference number by referring to the memory part 26, and determines whether the number of re-authentications is equal to or more than the reference number, at step S322.

The reference number indicates the number of re-authentications, which may guarantee the validity of the smart key 10, and may be set in various manners depending on a designer's intention. For example, the number of re-authentications may be set to one or two times.

When the number of re-authentications is less than the reference number, it may be considered that the authentication for the smart key 10 was likely to fail due to other causes. Thus, the control part 24 re-emits the authentication request message M2_REQ to perform re-authentication at step S324. Then, the control part 24 adds up re-authentications and stores the number of re-authentications in the memory part 24 at step S326.

On the other hand, when the number of re-authentications is equal to or more than the reference number, it may be considered that the smart key 10 is not a valid smart key. Thus, the control part 24 ends the operation.

The process from step S300 of determining whether the emission period Ta arrives or not to step S314 of authenticating the smart key 10 is the same as the process from step S100 to step S114 in FIG. 4. Thus, the detailed descriptions thereof are omitted herein.

As such, when re-authentication is performed by a predetermined number of times even though the authentication for the smart key 10 fails, the authentication may be normally performed even though a temporary error occurs due to a communication trouble. Therefore, the reliability of the operation may be improved.

In accordance with the embodiments of the present invention, the method for detecting a smart key around a vehicle performs the search operation for the smart key 10 using the small-volume registration request message M1_REQ including no encryption information, and performs the authentication operation using the authentication request message M2_REQ including encryption information. Thus, the power consumption may be reduced while security is maintained.

Furthermore, since the smart key 10 around the vehicle is searched through the small-volume registration request message M1_REQ, the interference with surrounding vehicles may be reduced.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A method for detecting a smart key around a vehicle, comprising:
    searching, by a control part, a smart key around a vehicle by emitting a registration request message at each preset emission period;
    when a response message to the registration request message is received from the smart key, checking, by the control part, whether the reception of the response message is maintained during a predetermined time;
    when the reception of the response message is maintained during the predetermined time, emitting, by the control part, an authentication request message containing encryption information for authenticating the smart key; and
    when an authentication message to the authentication request message is received from the smart key, authenticating, by the control part, the smart key based on the authentication message,
    wherein the size of the registration request message is smaller than the size of the authentication request message.

2. The method of claim 1, wherein at least one of the registration request message and the authentication request message comprises:
    a wakeup pattern region containing information for checking whether the smart key is a smart key registered for the vehicle; and
    a command region containing information for recognizing the registration request message or the authentication request message.

3. The method of claim 1, further comprising controlling, by the control part, a trunk driving part to open a trunk, when the authentication succeeds.

4. The method of claim 3, further comprising, after the controlling of the trunk driving part,
    determining, by the control part, whether the trunk is opened; and when the trunk is not opened, returning, by the control part, to the searching of the smart key around the vehicle.

5. The method of claim 1, further comprising, by the control part, emitting an initialization message to initialize the smart key, when the authentication succeeds.

6. The method of claim 1, further comprising re-emitting, by the control part, the authentication request message to re-authenticate the smart key, when the authentication fails.

7. The method of claim 1, further comprising checking, by the control part, whether the operation mode of the smart key is a hands-free mode, based on the response message.

* * * * *